United States Patent
Ford et al.

(10) Patent No.: US 10,681,931 B2
(45) Date of Patent: Jun. 16, 2020

(54) HIGH PROTEIN PUFFED WHOLE EGG SNACK AND METHOD OF MAKING SAME

(71) Applicant: Cargill, Incorporated, Wayzata, MN (US)

(72) Inventors: Faith Ford, Big Lake, MN (US); Aaron Reed, Columbia Heights, MN (US); Chad Rieschl, Brooklyn Park, MN (US)

(73) Assignee: Cargill, Incorporated, Wayzata, MN (US)

( * ) Notice: Subject to any disclaimer, the term of this patent is extended or adjusted under 35 U.S.C. 154(b) by 118 days.

(21) Appl. No.: 15/756,357

(22) PCT Filed: Aug. 31, 2016

(86) PCT No.: PCT/US2016/049629
§ 371 (c)(1),
(2) Date: Feb. 28, 2018

(87) PCT Pub. No.: WO2017/040610
PCT Pub. Date: Mar. 9, 2017

(65) Prior Publication Data
US 2018/0242621 A1  Aug. 30, 2018

Related U.S. Application Data

(60) Provisional application No. 62/212,780, filed on Sep. 1, 2015.

(51) Int. Cl.
| A23L 15/00 | (2016.01) |
| A23P 30/34 | (2016.01) |
| A23L 33/185 | (2016.01) |
| A23J 3/26 | (2006.01) |
| A23L 7/17 | (2016.01) |

(52) U.S. Cl.
CPC ............ *A23L 15/20* (2016.08); *A23J 3/26* (2013.01); *A23L 7/17* (2016.08); *A23L 33/185* (2016.08); *A23P 30/34* (2016.08); *A23V 2002/00* (2013.01)

(58) Field of Classification Search
CPC ........ A23L 15/20; A23L 33/185; A23P 30/34; A23V 2002/00
See application file for complete search history.

(56) References Cited

U.S. PATENT DOCUMENTS

| 4,746,521 A | 5/1988 | Niwano et al. |
| 2004/0037926 A1 | 2/2004 | Akimoto et al. |
| 2006/0019009 A1* | 1/2006 | Keller .................. A23P 30/34 |
| | | 426/516 |
| 2007/0092616 A1 | 4/2007 | Witte et al. |
| 2008/0102165 A1 | 5/2008 | Ning et al. |
| 2009/0220674 A1 | 9/2009 | Katz et al. |
| 2012/0003365 A1 | 1/2012 | Ramirez et al. |
| 2012/0064209 A1 | 3/2012 | Ardisson-Korat et al. |
| 2013/0022731 A1* | 1/2013 | Olson ....................... A23L 5/11 |
| | | 426/614 |
| 2014/0154395 A1 | 6/2014 | Alden |
| 2014/0220225 A1 | 8/2014 | Alden et al. |

FOREIGN PATENT DOCUMENTS

| WO | 2006019686 A2 | 2/2006 |
| WO | 2006130025 A1 | 12/2006 |
| WO | 2013067453 A1 | 5/2013 |

OTHER PUBLICATIONS

Bangoura, "Formulation and Nutritional Quality of Extruded Weaning Food Supplemented With Whole Egg Powder", American Journal of Food Technology, vol. 2, Issue 6, 2007, 477-489.

* cited by examiner

*Primary Examiner* — Anthony J Weier

(57) ABSTRACT

A snack food is prepared by a unique process including extruding an extrusion composition under heat and pressure to form an expanded, cooked, egg and added-protein snack food, wherein the extrusion composition includes a) whole liquid egg present in an amount of from about 5 to about 25% by weight based on the total weight of the extrusion composition, b) an added protein concentrate or isolate selected from the group consisting of rice protein, soy protein, whey protein or mixtures thereof, in an amount so that the total protein present in the expanded, cooked, egg and added-protein snack food is from about 25 to about 40% by weight, and c) starch in an amount sufficient to provide an expanded, cooked, egg and added-protein snack food having a density no greater than about 300 grams per cubic inch.

15 Claims, No Drawings

HIGH PROTEIN PUFFED WHOLE EGG SNACK AND METHOD OF MAKING SAME

CROSS REFERENCE TO RELATED APPLICATION

This application is a national phase application of PCT/US2016/049629, filed 31 Aug. 2016, entitled HIGH PROTEIN PUFFED WHOLE EGG SNACK, which claims the benefit of priority to U.S. Provisional Application No. 62/212,780, 1 Sep. 2015, entitled HIGH PROTEIN PUFFED WHOLE EGG SNACK, which are hereby incorporated by reference in their entirety.

FIELD OF THE INVENTION

The present invention relates to puffed snacks. More specifically, the present invention relates to high protein puffed snacks comprising whole eggs.

BACKGROUND OF THE INVENTION

Consumer snacking behavior is changing. Snacking has expanded to occur at all times in the day, and is often looked upon as a meal replacement. The demand for healthier snacks continues to grow with an emphasis on products bearing claims for protein, absence of gluten, and being made from a simple list of ingredients.

One category of popular snack products is the crisp snack foods known as "chips" in the United States and as "crisps" in Europe. These products are usually fried and have high fat and carbohydrate content. Very low density snack products are also common in the marketplace, such as popcorn and cheese curls or cheese puffs. These products often also have high fat and carbohydrate content.

US Patent Application Publication Nos. 2014/0065285; 2014/0154395; 2014/0220225; and 2015/0064334, all to Alden, describe crunchy egg products that are stated to comprise a high egg percentage by volume and a low water content by weight, audible fracturing characteristics, and brittleness characteristics.

US Patent Application Publication No. 2005/0089623 to Fannon describes a proteinacious food product formed by extrusion that is a stated to be a crisp or frangible product that is high in protein. The protein source for this product is preferably selected from seed products and legumes.

US Patent Application Publication No. 2013/0022731 to Olson relates to high protein, low carbohydrate meal replacements and food. The Summary of the Invention indicates that the invention described therein relates to a new class of food that is crispy, tasty, and low in carbohydrates and has substantial levels of egg white protein and suitable shelf life for packaging in ready to eat form.

SUMMARY OF THE INVENTION

The present invention provides a snack product that is an expanded food product that is high in protein, and prepared from egg as a major ingredient. The resulting product is a uniquely light, puffed product that is an expanded, cooked egg and added-protein snack food having a high protein content. This product enables consumers to enjoy a satisfying snack food treat while maintaining a high protein diet.

It has been discovered that an expanded, cooked egg and added-protein snack food can be prepared that comprises a highly desirable protein profile including egg protein. The extrusion composition comprises a select mixture of proteins and starch that provides excellent protein/nutritional content and density/crispness properties.

Specifically, a snack food is prepared by a unique process comprising extruding an extrusion composition under heat and pressure to form an expanded, cooked, egg and added-protein snack food, wherein the extrusion composition comprises a) whole liquid egg present in an amount of from about 5 to about 25% by weight based on the total weight of the extrusion composition, b) an added protein concentrate or isolate selected from the group consisting of rice protein, soy protein, whey protein or mixtures thereof, so that the total protein present in the expanded, cooked, egg and added-protein snack food is from about 25 to about 40% by weight, and c) starch in an amount sufficient to provide an expanded, cooked, egg and added-protein snack food having a density no greater than about 300 grams per cubic inch.

It has been found that whole egg may advantageously be used in preparation of an expanded food product made by an extrusion process. By use of the whole egg, a very high protein content composition having excellent extrusion properties with less addition of water can be obtained. The reduction of amount of added water (i.e. water that is added as a separate component and not already naturally associated with an ingredient, such as whole egg) is advantageous, because it simplifies the manufacturing process and takes advantage of a readily obtained, complete starting material that does not require intermediate processing steps, such as separation or drying. Use of the whole egg, rather than only the white or yolk, is advantageous as a superior source of a desirable array of proteins.

Additionally, it has surprisingly been found that when the extrusion composition comprises whole liquid egg present in an amount of from about 5 to about 25% by weight, the composition exhibits excellent viscosity control, mixing and lubrication properties before and during the extrusion process.

Furthermore, the present extrusion composition exhibits excellent extrusion properties even when the composition does not comprise added hydrocolloids, oil or fat, or pH adjusting ingredients. Thus, in an embodiment of the present invention, the extrusion composition is free of added hydrocolloid. In an embodiment of the present invention, the extrusion composition is free of added oil and fat (other than is naturally present in the egg). In an embodiment of the present invention, the extrusion composition is free of pH adjusting ingredients in an amount that would modify the pH of the extrusion composition more than 1 pH unit or, in an embodiment, more than 0.5 pH units.

The final product unexpectedly has a "puff" consistency not previously associated with products containing egg as a major component. Additionally, it was not expected to be able to prepare a puffed snack product by a highly efficient extrusion process whereby a very simple egg-based composition may be extruded under heat and pressure to form an expanded, cooked, egg and protein snack food product.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

For purposes of the present invention, the term "extrusion composition" refers to the identity and the relative amounts of the ingredients added to the extruder to produce the final product, whether these ingredients are pre-mixed and added in one addition, or are added separately at the same stage or at different stages in the extruder. Thus, the extrusion composition is essentially the starting recipe for the final product. For purposes of the present invention, the term "extruded product" refers to the product immediately after it exits the extruder, but before any additional processing step, such as drying or baking. For purposes of the present invention, the term "expanded, cooked egg and added-protein snack food" refers to the final product after completion of all processing steps, including, for example, final drying of the product.

As noted above, the extrusion composition comprises whole liquid egg in an amount of from about 5 to about 25% by weight based on the total weight of the extrusion composition. It has been found that use of whole liquid egg in an amount that is less than about 5% does not provide the desired nutritional benefit of this ingredient. Additionally, use of whole liquid egg in an amount greater than 25% results in a product that does not have the desired low density and bite characteristics. In an embodiment, the extrusion composition comprises whole liquid egg in an amount of from about 5% to about 15% by weight based on the total weight of the extrusion composition.

In an embodiment, the extrusion composition comprises whole liquid egg in an amount of from about 7% to about 15%, from about 10% to about 15%, by weight based on the total weight of the extrusion composition. This embodiment is particularly beneficial because very little or no added water is required in the extrusion composition, which nevertheless exhibits excellent extrusion performance properties. In an embodiment, the extrusion composition comprises whole liquid egg in an amount of from about 7% to about 15%, or from about 10% to about 15%, by weight based on the total weight of the extrusion composition, and less than about 5% or 3% of added water by weight based on the total weight of the extrusion composition.

Optionally, the extrusion composition may be augmented by addition of less than about 10 wt % based on the total weight of the extrusion composition of added egg components selected from the group consisting of powdered whole egg, powdered egg white, powdered egg yolk, liquid egg white, liquid egg yolk, and combinations thereof.

The extrusion composition comprises an added protein concentrate or isolate selected from the group consisting of rice protein, soy protein, whey protein or mixtures thereof, in an amount so that the total protein present (including, e.g., protein sourced from the whole egg) in the expanded, cooked, egg and added-protein snack food is from about 25 to about 40% by weight. For purposes of the present invention, a protein concentrate is a protein formulation comprising from 70 to 90% protein by weight and a protein isolate is a protein formulation comprising from 90 to 100% protein by weight. In an embodiment, the added protein concentrate or isolate is a protein concentrate. In an embodiment, the added protein concentrate or isolate is a protein isolate. In an embodiment, the added protein concentrate or isolate is a mixture of at least one protein concentrates and one protein isolate.

In an embodiment, the added protein concentrate or isolate is present in an amount of from about 20 to about 40% by weight based on the total weight of the extrusion composition. It has been found that if the added protein concentrate or isolate is present in an amount less than about 20%, the final product does not exhibit the desired density and bite characteristics. It has been found that if the added protein concentrate or isolate is present in an amount greater than about 40%, the final product does not exhibit the desired density and bite characteristics and additionally may exhibit undesirable or "off" flavors. In an embodiment, the added protein concentrate or isolate is present in an amount of from about 25 to about 35% by weight based on the total weight of the extrusion composition.

It has surprisingly been found that the selection of the source of the added protein concentrate or isolate is important to the texture of the final extruded product. Specifically, it has been found that adding pea and wheat based protein concentrate or isolate results in a product that has a dense and hard/crunchy product texture, rather than a desired puffy crisp product texture. However, the use of protein concentrate or isolate selected from the group consisting of rice protein, soy protein, whey protein or mixtures thereof provides a final product exhibiting a unique, desired density and light, crispness.

In an embodiment, the added protein concentrate or isolate is a rice protein. In an embodiment, the added protein concentrate or isolate is a rice protein concentrate. In an embodiment, at least about 50% of the rice protein of the protein concentrate or isolate is brown rice protein. In an embodiment, all of the rice protein of the protein concentrate or isolate is brown rice protein. In an embodiment, all of the rice protein of the protein concentrate or isolate is obtained from non-germinated (i.e. non-sprouted) rice.

In an embodiment, the added protein concentrate or isolate is a soy protein. In an embodiment, the added protein concentrate or isolate is a soy protein isolate. In an embodiment, all of the soy protein of the protein concentrate or isolate is obtained from texturized soy.

In an embodiment, the added protein concentrate or isolate is a whey protein. In an embodiment, the added protein concentrate or isolate is a whey protein isolate. In an embodiment, all of the whey protein of the protein concentrate or isolate is obtained from whey hydrolysate.

In an embodiment, the added protein concentrate or isolate is provided in powder form. In an embodiment, the added protein has a particle size such that at least 95% of the particles pass through a 200 mesh screen. In an embodiment, the added protein has a particle size such that at least 9% of the particles pass through a 100 mesh screen. In an embodiment, the added protein has a particle size such that at least 95% of the particles pass through an 80 mesh screen.

In an embodiment, the extrusion composition comprises a further added protein that is a non-concentrate protein selected from vegetable, grain or dairy protein. In an embodiment, non-concentrate protein selected from the group consisting of corn, rice and wheat. For purposes of the present invention, a non-concentrate protein is a protein formulation comprising less than 70 protein by weight.

The extrusion composition comprises starch in an amount sufficient to provide an expanded, cooked, egg and added-protein snack food having a density no greater than about 300 grams per cubic inch. In an embodiment, the starch is derived from a vegetable. In an embodiment, the starch is derived from a grain. In an embodiment, the starch is derived from a material selected from corn, potato, sweet potato, cassava, rice, wheat, barley, millet, legumes, and mixtures thereof. In an embodiment, the starch is unmodified starch.

In an embodiment, the starch is unmodified starch selected from corn starch, potato starch, rice starch and mixtures thereof.

In an embodiment, the starch is a component of an ingredient comprising from about 50 to 100% carbohydrate by weight. In an embodiment, the starch is a component of an ingredient comprising from about 70 to 90% carbohydrate by weight. In an embodiment, the starch is a component of an ingredient comprising no more than about 15% fiber by weight. In an embodiment, the starch is corn in the form of corn meal.

In an embodiment, the starch is a refined starch.

In an embodiment, the starch is selected from a starch having a peak viscosity of from about 2200 to about 3000 mPa·s.

In an embodiment, the expanded, cooked, egg and added-protein snack food comprises more starch by weight than protein by weight. In an embodiment, the extrusion composition comprises from about 45 to about 75% by weight starch based on the total weight of the extrusion composition.

The expanded, cooked, egg and added-protein snack food may comprise additional added ingredients, such as flavorants (including seasonings), salt, colorants, preservatives and other such additives appropriate for use in the snack industry. In an embodiment, the extrusion composition comprises food ingredients from additional food sources, such as fruits and nuts.

The expanded, cooked, egg and added-protein snack food prepared by the present process has a high protein content, but in an embodiment advantageously has a carbohydrate content of at least 10 g per 30 g serving.

In an embodiment, the extrusion composition comprises an ingredient declaration having no more than six ingredients. It has been found that presentation of a snack product having an ingredient list that is not complex provides substantial benefit to the consumer. In an embodiment, the extrusion composition (and final product) is gluten free. In an embodiment, the extrusion composition (and final product) is lactose free. In an embodiment, the extrusion composition (and final product) is peanut free. In an embodiment, the extrusion composition (and final product) is nut free. In an embodiment, the extrusion composition (and final product) contains only ingredients defined as organic. In an embodiment, the extrusion composition (and final product) is made only using ingredients from non-gmo sources. In an embodiment, the extrusion composition (and final product) is made only using ingredients and processes that are Kosher.

The extrusion is carried out using any appropriate extruder fitted to provide heat and pressure thereto. In an embodiment, the extruder is a twin screw extruder. An example of such an extruder is the BMIN Buhler BCTG-62 twin screw extruder.

The extruder is fitted with a die to produce a final product having a desired shape. In an embodiment, the die is a "W" shaped die. In an embodiment, the die is "wave" shaped, e.g. having 4-5 turns.

In an embodiment, the die is heated to a temperature of from about 100° C. to about 180° C., more preferably from about 120° C. to about 160° C. In an embodiment, the extruder is operated under a Head Pressure of from about 20 bar to about 80 bar, or from about 30 bar to about 60 bar.

In an embodiment, the extrusion composition comprises added water that is introduced to the composition prior to or during extraction. In an embodiment, the added water is introduced in liquid form. In an embodiment, the added water is introduced in steam form during the extrusion. In an embodiment, the added water is introduced downstream in the extruder from the place of introduction of dry ingredients in the extruder.

In an embodiment, the extrusion composition comprises water from any source in an amount so that immediately after extrusion, the composition comprises from about 8 to about 12% water by weight based on the total weight of the extrusion composition.

In an embodiment, the process further comprises the step of drying the extrusion product to a water content of from about 1% to about 3% water by weight based on the total weight of the final product. Drying may be carried out by any appropriate technique, such as by passing the extruded and cut product through a drying oven. In an embodiment, the composition immediately after drying comprises no more than about 3% water by weight based on the total weight of the product.

The extruded product is cut or otherwise divided into snack portions after exiting the extruder in any manner appropriate under food processing conditions to form an expanded, cooked egg and added-protein snack food product.

The extrusion product may optionally be subjected to a final baking step. In an embodiment, the extrusion product is baked at a temperature of from about 250° F. to about 320° F., more preferably from about 280° F. to about 300° F., for a time of from about 5 to 12 minutes.

In an embodiment, the prepared expanded, cooked, egg and protein snack food has a density of less than 300 grams per 100 cubic inch. In an embodiment, the prepared expanded, cooked, egg and protein snack food has a density of from about 90 to about 250 grams per 100 cubic inch. In an embodiment, the prepared expanded, cooked, egg and protein snack food has a density of from about 110 to about 220 grams per 100 cubic inch.

In an embodiment, the prepared expanded, cooked, egg and protein snack food exhibits a desirable light crunch bite as is recognizable by consumer testing panels, in contrast to a chewy or tough textured food snack.

In an embodiment, the prepared expanded, cooked, egg and protein snack food has a water content of no more than about 3% water by weight based on the total weight of the final product. In an embodiment, the prepared expanded, cooked, egg and protein snack food has a water content of from about 1% to about 3% water by weight based on the total weight of the final product.

EXAMPLES

Representative embodiments of the present invention will now be described with reference to the following examples that illustrate the principles and practice of the present invention.

Extrusion Process

The compositions described below are extruded in a twin screw extruder, by pre-mixing of addition of dry ingredients and introduction of the mixed dry ingredients to the extruder. The liquid ingredients (including egg) are introduced downstream in the extruder. The extruder is operated at a conventional, uniform temperature and pressure with respect to all samples, so that product characteristics may be evaluated based on the extrusion compositions alone without variation of process conditions.

Composition Preparation and Results

Example 1

An extrusion composition was prepared comprising the following ingredients:

| Ingredient | % |
|---|---|
| Whole liquid egg | 11.65% |
| Corn meal | 39.28% |
| Rice Protein (80% minimum protein content) | 30.92% |
| Starch | 17.67% |
| Sodium Bicarbonate | 0.44% |
| Mixed Tocopherols | 0.04% |

The resulting product, after drying to 3% moisture, had a total protein content of 33.95 grams per 100 grams of product and 59 grams of carbohydrate per 100 grams of product. The product had an acceptable puff characteristic and flavor that was influenced by the rice protein.

Example 2

An extrusion composition was prepared comprising the following ingredients:

| Ingredient | % |
|---|---|
| Whole liquid egg | 15.07% |
| Corn meal | 40.73% |
| Whey Protein (90% minimum protein content) | 26.75% |
| Starch | 16.99% |
| Sodium Bicarbonate | 0.42% |
| Mixed Tocopherols | 0.03% |

The resulting product, after drying to 3% moisture, had a total protein content of 34.76 grams per 100 grams of product and 59 grams of carbohydrate per 100 grams of product. The product had an overall density of 114 g+/−5 grams per 100 cubic inch. The product had an excellent puff characteristic, color and flavor.

Comparative Example A. Insufficient Starch and High Protein Content

An extrusion composition was prepared comprising the following ingredients:

| Ingredient | % |
|---|---|
| Whole liquid egg | 16.70% |
| Corn meal | 49.53% |
| Rice Protein (80% minimum protein content) | 33.3% |
| Sodium Bicarbonate | 0.42% |
| Mixed Tocopherols | 0.03% |

The resulting product, after drying to 3% moisture, had a total protein content of 39.25 grams per 100 grams of product. The product was unacceptably dense and had an unacceptably intense rice protein flavor. The product also exhibited an unacceptable level of hardness.

Comparative Example B. Powdered Egg as Protein Concentrate

An extrusion composition was prepared comprising the following ingredients:

| Ingredient | % |
|---|---|
| Whole Grain Corn Flour | 41.9% |
| Corn meal | 20.5% |
| Sodium Bicarbonate | 0.42% |
| Dried Egg White (80% minimum protein content) | 21% |
| Liquid Whole Egg | 16.2% |

The resulting product, after drying to 3% moisture, had a total protein content of 29.14 grams per 100 grams of product. The product was unacceptably dense and exhibited a poor flavor profile.

Comparative Example C. Not Proper Added Protein Source

An extrusion composition was prepared comprising the following ingredients:

| Ingredient | % |
|---|---|
| Whole liquid egg | 10.51% |
| Corn meal | 36.17% |
| Pea Protein (80% minimum protein content) | 28.48% |
| Starch | 16.27% |
| Sodium Bicarbonate | 0.41% |
| Mixed Tocopherols | 0.03% |
| Water | 8.14% |

The resulting product, after drying to 3% moisture, had a total protein content of 33.72 grams per 100 grams of product. The product had an overall density of 278 g+/−5 grams per 100 cubic inch. Use of pea protein in the formulation with whole liquid egg caused a portion of the extrudate to exhibit an unacceptable degree of dark color and dense texture.

Comparative Example D. Not Proper Added Protein Source

An extrusion composition was prepared comprising the following ingredients:

| Ingredient | % |
|---|---|
| Whole liquid egg | 15% |
| Corn meal | 44.59% |
| Wheat Protein (82% minimum protein content) | 29.75% |
| Starch | 10.2% |
| Sodium Bicarbonate | 0.43% |
| Mixed Tocopherols | 0.03% |

The resulting product, after drying to 3% moisture, had a total protein content of 35.24 grams per 100 grams of product. The product had an overall density of 217 g+/−5 grams per 100 cubic inch. Use of wheat protein in the formulation with whole liquid egg caused a portion of the extrudate to exhibit an unacceptable degree of dark color and local regions of dense texture.

As used herein, the terms "about" or "approximately" mean within an acceptable range for the particular parameter specified as determined by one of ordinary skill in the art, which will depend in part on how the value is measured or determined, e.g., the limitations of the sample preparation and measurement system. Examples of such limitations include preparing the sample in a wet versus a dry environment, different instruments, variations in sample height, and differing requirements in signal-to-noise ratios. For example, "about" can mean greater or lesser than the value or range of values stated by 1/10 of the stated values, but is not intended to limit any value or range of values to only this broader definition. For instance, a concentration value of about 30% means a concentration between 27% and 33%. Each value or range of values preceded by the term "about" is also intended to encompass the embodiment of the stated absolute value or range of values. Alternatively, particularly with respect to biological systems or processes, the term can mean within an order of magnitude, preferably within 5-fold, and more preferably within 2-fold, of a value.

Throughout this specification and claims, unless the context requires otherwise, the word "comprise", and variations such as "comprises" and "comprising", will be understood to imply the inclusion of a stated integer or step or group of integers or steps but not the exclusion of any other integer or step or group of integer or step. When used herein "consisting of" excludes any element, step, or ingredient not specified in the claim element. When used herein, "consisting essentially of" does not exclude materials or steps that do not materially affect the basic and novel characteristics of the claim. In the present disclosure of various embodiments, any of the terms "comprising", "consisting essentially of" and "consisting of" used in the description of an embodiment may be replaced with either of the other two terms.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A process for preparing an expanded, cooked egg and added-protein snack food comprising
extruding an extrusion composition under heat and pressure to form an expanded, cooked, egg and added-protein snack food;
wherein the extrusion composition comprises
a) whole liquid egg present in an amount of from about 5 to about 15% by weight based on the total weight of the extrusion composition,
b) an added protein concentrate or isolate selected from the group consisting of rice protein, soy protein, whey protein or mixtures thereof, in an amount of from about 20 to about 40% by weight based on the total weight of the extrusion composition, and so that the total protein present in the expanded, cooked, egg and added-protein snack food is from about 25 to about 40% by weight, and
c) starch in an amount sufficient to provide an expanded, cooked, egg and added-protein snack food having a density no greater than about 300 grams per cubic inch.

2. The process of claim 1, wherein at least about 50% of the rice protein in the composition is brown rice protein.

3. The process of claim 1, wherein the rice protein in the composition is brown rice protein.

4. The process of claim 1, wherein the added protein concentrate or isolate is present in an amount of from about 25 to about 35% by weight based on the total weight of the extrusion composition.

5. The process of claim 1, wherein the starch is present in an amount of from about 5 to about 30% by weight based on the total weight of the extrusion composition.

6. The process of claim 1, wherein the starch is selected from corn, potato, sweet potato, cassava, rice, wheat, barley, millet, legumes, and mixtures thereof.

7. The process of claim 1, wherein the starch is a refined starch, an unmodified starch, and mixtures thereof.

8. The process of claim 1, wherein the starch comprises corn in the form of corn meal.

9. The process of claim 1, wherein the composition immediately after extrusion comprises no more than about 10% water by weight based on the total weight of the extrusion composition.

10. The process of claim 1, wherein water is added to the extrusion composition during extrusion in the form of steam.

11. The process of claim 1, wherein the dry components of the extrusion composition are mixed prior to introduction into an extruder.

12. The process of claim 1, wherein the prepared expanded, cooked, egg and added-protein snack food has a density of from about 90 to about 250 grams per 100 cubic inch.

13. The process of claim 1, wherein the prepared expanded, cooked, egg and added-protein snack food has a carbohydrate content of at least 10 g per 30 g serving.

14. The process of claim 1, further comprising the step of drying the extrusion composition after extrusion to a water content of no more than about 3% water by weight based on the total weight of the final product.

15. The product made according to the process of claim 1.

* * * * *